O. A. LANE, D. GUICE & H. P. DOHRMEIER.
CRATE OR BOX.
APPLICATION FILED JULY 24, 1916.

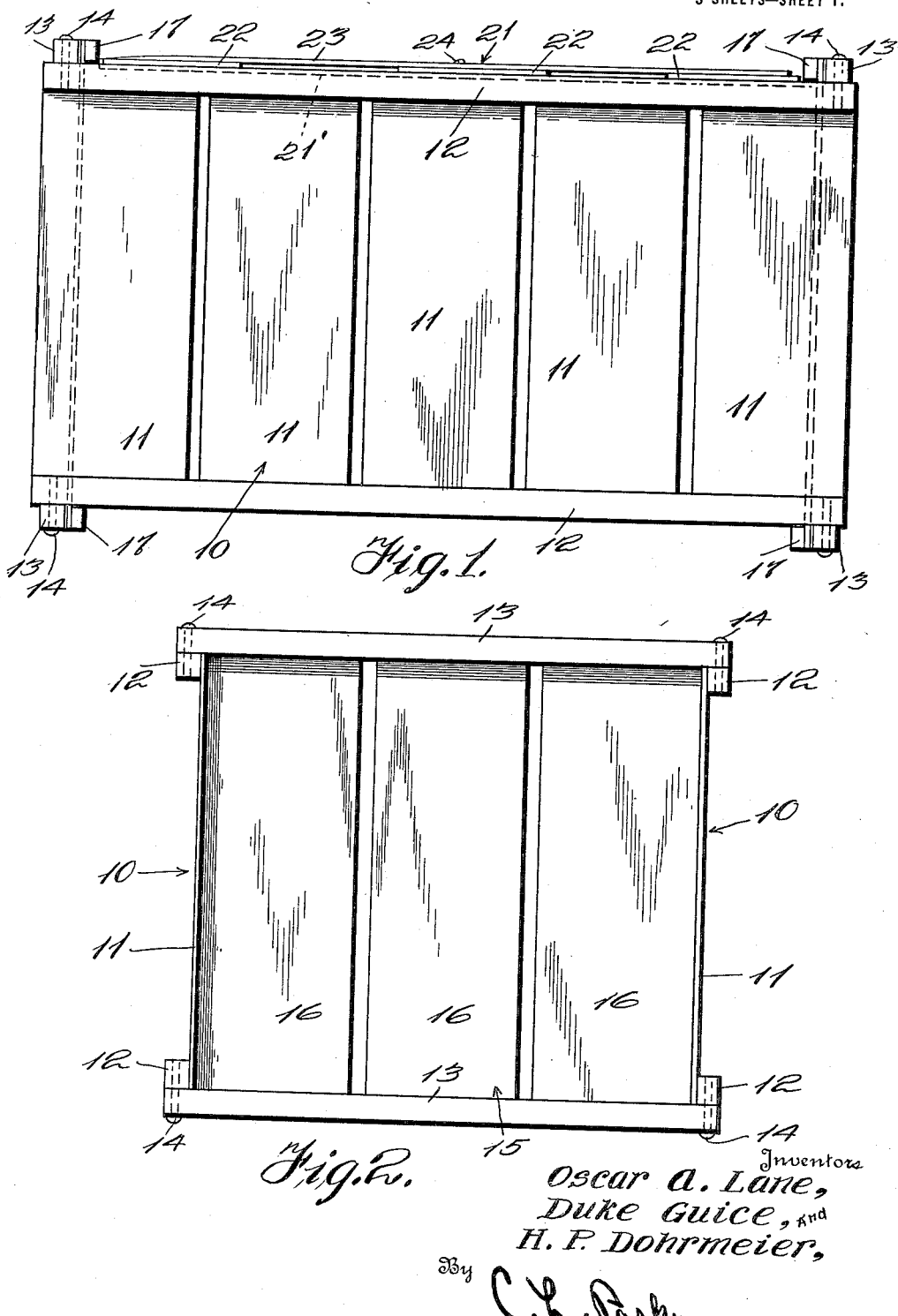

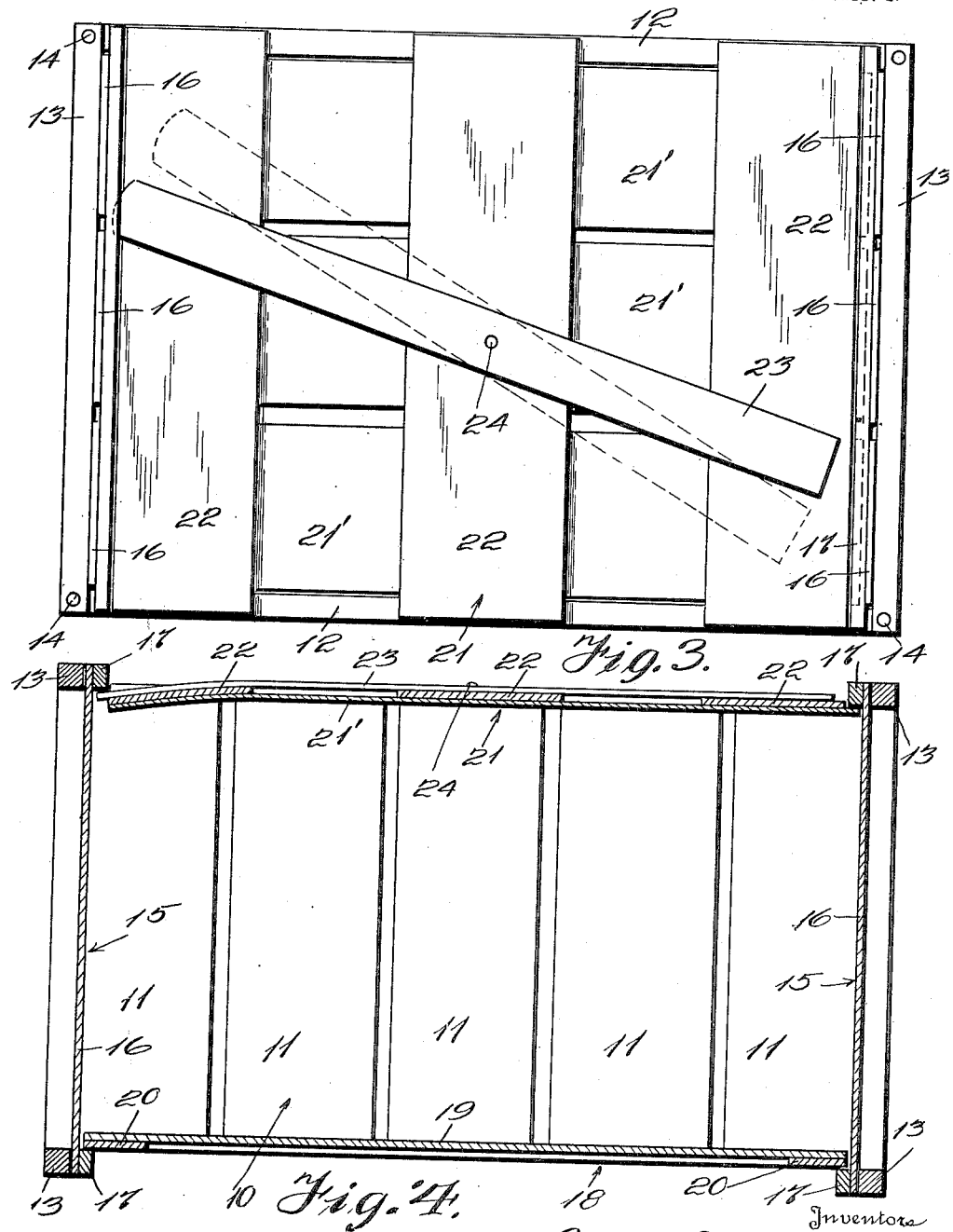

1,232,337.

Patented July 3, 1917.
3 SHEETS—SHEET 3.

Inventors
Oscar A. Lane,
Duke Guice, and
H. P. Dohrmeier,
By
C. L. Parker
Attorney

UNITED STATES PATENT OFFICE.

OSCAR A. LANE, DUKE GUICE, AND HERMAN P. DOHRMEIER, OF GREENVILLE, ALABAMA.

CRATE OR BOX.

1,232,337.     Specification of Letters Patent.     Patented July 3, 1917.

Application filed July 24, 1916. Serial No. 110,987.

*To all whom it may concern:*

Be it known that we, OSCAR A. LANE, DUKE GUICE, and HERMAN P. DOHRMEIER, citizens of the United States, residing at Greenville, in the county of Butler and State of Alabama, have invented certain new and useful Improvements in Crates or Boxes, of which the following is a specification.

The present invention relates to foldable or collapsible crates or boxes, and has particular reference to improvements in the crate or box shown in United States Letters Patent No. 1,137,407, granted under date of April 27, 1915, to Oscar A. Lane, Duke Guice, and Herman P. Dohrmeier.

The invention aims to improve the construction of the patented crate or box, with a view of rendering the same stronger, cheaper to manufacture, and more convenient in use.

Other objects and advantages of the invention will be apparent during the course of the following description.

Figure 5:
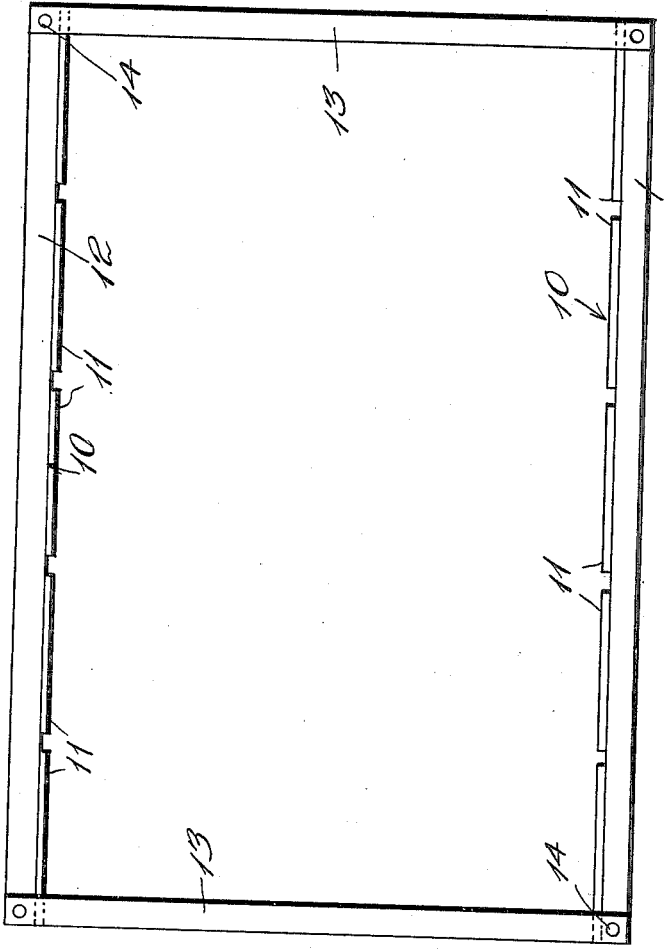
Figure 6:
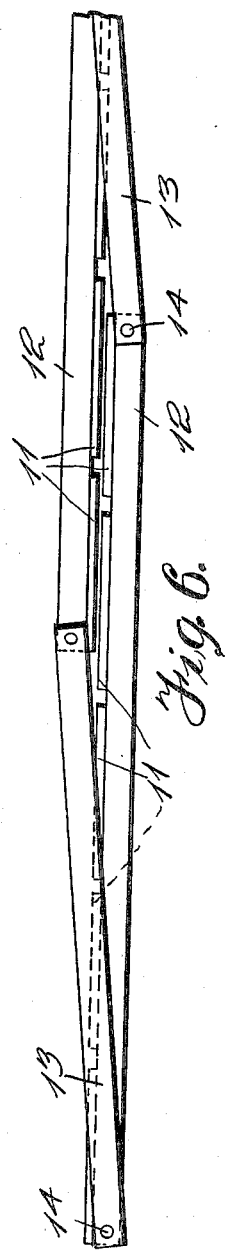

In the accompanying drawings forming a part of this specification and in which like numerals are employed to designate like parts throughout the same, Figure 1 is a side elevation of a crate or box embodying the invention, Fig. 2 is an end elevation of the same, Fig. 3 is a plan view of the same, Fig. 4 is a central vertical longitudinal sectional view through the crate, Fig. 5 is a plan view of the side members and their connecting members, the other parts of the crate being removed, and, Fig. 6 is a similar view with the parts collapsed.

In the drawings, wherein for the purpose of illustration is shown a preferred embodiment of our invention, the numeral 10 designates the side members of the crate or box, each of which comprises spaced strips 11, such as veneer, which are rigidly attached to upper and lower reinforcing bars or members 12, arranged upon the outer side thereof, at their upper and lower ends. The side members 10 are permanently connected by upper and lower transverse connecting members 13, arranged above and below the reinforcing members 12, and contacting with the end portions thereof, as shown. The adjacent ends of the reinforcing members 12 and connecting members 13 are apertured for the reception of pivot elements 14, which may be nails or the like. As clearly shown in Fig. 6, the side members which are thus permanently pivotally connected, may be collapsed.

The numeral 15 designates end members as a whole, each of which comprise preferably spaced strips 16, of veneer or the like, which are provided at their tops and bottoms with transverse bars or members 17, rigidly secured to the inner sides thereof. The bars 17 extend at their ends outwardly beyond the strips 16 for a substantial distance and are adapted to be arranged above and below the reinforcing members 12. When the end members 15 are in their operative positions, the bars or members 17 are disposed upon the inner sides of the strips 16, and these strips are arranged inwardly of and contact with the connecting members 13, and are thus reinforced thereby against outward movement, in a similar manner to securing the connecting members 13 to the strips. This provides a strong construction, as the end members receive the reinforcing action of the bars 17 and the connecting members 13.

The numeral 18 designates the bottom member as a whole, formed of preferably spaced longitudinal strips 19 of veneer or the like, which are rigidly connected at their ends by transverse strips 20, arranged therebelow. As clearly shown in Fig. 4, when the bottom member 18 is in the operative position, the transverse strips 20 thereof rest upon and are supported by the lower bars or members 17, this bottom member of course having a proper fit between the side and end members.

The numeral 21 designates a top member or cover as a whole, formed of preferably spaced longitudinal strips 21', which may be veneer. These strips are rigidly connected by spaced strips 22, arranged upon the exterior or top thereof. The strips 22 extend at their ends outwardly beyond the strips 21', which are adapted to fit between the side members 10, while the transverse strips 22 contact with and are supported by the side members 10 and their reinforcing members 12. One transverse strip 22 is flush with the end of the top member 21, while the other end strip 22 is spaced a substantial distance from the corresponding end of the top member, whereby the ends of the longitudinal strips 21' are adapted for insertion beneath the transverse bar or member 17, as clearly shown in Fig. 4.

The numeral 23 designates a latch-strip, pivoted to the inner strip 22, as shown at 24. One end of this latch-strip is adapted for insertion beneath the opposite bar or member 17, and thereby serves to lock the top member 21 in the closed position. By sufficient turning movement of the latch member 23, both ends of the same may be brought beneath the two bars or members 17.

In assembling the crate or box the connected side members 10 are first arranged parallel, as shown in Fig. 5. The end members 15 are then arranged within and between the side members. The members or bars 17 of these end members contact with the reinforcing members 12. The bottom member 18 is now arranged between the assembled side and end members and is supported by the members 17. The top member 21 is now placed in position and may be locked in the closed position by proper manipulation of the latch-strip 23.

It is to be understood that the form of our invention herewith shown and described is to be taken as a preferred example of the same, and that various changes in the shape, size, and arrangement of parts may be resorted to without departing from the spirit of the invention or the scope of the subjoined claims.

Having thus described the invention, we claim:

1. A crate or box of the character described; comprising side members provided with exterior approximately horizontal reinforcing members attached to the same at their tops and bottoms; transverse connecting members pivotally connected with the approximately horizontal reinforcing members; end members adapted for insertion between the side members and inwardly of the transverse connecting members and provided with interior transverse reinforcing members secured thereto at their tops and bottoms, the transverse reinforcing members extending at their ends outwardly beyond the end members for a substantial distance and adapted to overlap the approximately horizontal reinforcing members of the side members; a bottom member adapted for insertion between the side and end members to be supported by the lower transverse reinforcing members of the end members; a top member; and means to hold the top member in the closed position.

2. A crate or box of the character described; comprising side members provided with exterior approximately horizontal reinforcing members attached to the same at their tops and bottoms; transverse connecting members permanently pivotally connected with the approximately horizontal reinforcing members and serving to pivotally connect the side members so that they can be collapsed; end members adapted for insertion between the side members and provided at their tops and bottoms with interior transverse reinforcing members which extend at their ends outwardly beyond the same for a substantial distance, the transverse reinforcing members overlapping the approximately horizontal reinforcing members of the end members and the end members contacting with the inner sides of the connecting members to be reinforced thereby; a bottom member adapted to be arranged between the side and end members and to be supported by the lower transverse reinforcing members of the end members; a top member comprising longitudinal strips adapted to have corresponding ends inserted beneath one upper transverse reinforcing member of one end member, and transverse strips rigidly connecting the longitudinal strips and extending at their ends outwardly beyond the same for a substantial distance and adapted to contact with and be supported by the upper approximately horizontal reinforcing members of the side members; and means to lock the opposite end of the top member in the closed position.

In testimony whereof we affix our signatures in the presence of two witnesses.

OSCAR A. LANE.
DUKE GUICE.
HERMAN P. DOHRMEIER.

Witnesses:
LENA SAMMONS,
L. M. LANE.

Copies of this patent may be obtained for five cents each, by addressing the "Commissioner of Patents, Washington, D. C."